United States Patent [19]

Seay et al.

[11] Patent Number: 4,470,819
[45] Date of Patent: Sep. 11, 1984

[54] INSTRUMENT FLIGHT TRAINING AID

[76] Inventors: William J. Seay, Rte. 2, Box 50A-24, Gainesville, Ga. 30506; George C. Rodgers, 1662 Berkeley La. NE., Atlanta, Ga. 30329

[21] Appl. No.: 333,709

[22] Filed: Dec. 23, 1981

[51] Int. Cl.$^3$ .............................................. G09B 9/08
[52] U.S. Cl. .................................................... 434/49
[58] Field of Search ....................... 434/29, 30, 49, 50, 434/51, 69

[56] References Cited

U.S. PATENT DOCUMENTS 3,613,263  10/1971  Schuster ................................. 434/69

FOREIGN PATENT DOCUMENTS 1500263  2/1978  United Kingdom .................. 434/49

Primary Examiner—William H. Grieb
Attorney, Agent, or Firm—Jones & Askew

[57] ABSTRACT

An instrument flight training aid for learning flight instrument scanning patterns. The training aid comprises a simulated instrument panel including a plurality of simulated flight instruments spaced from each other on the panel. Visual indicators selectively provide visual indications of selected ones of the simulated flight instruments to be scanned by one observing the panel.

10 Claims, 6 Drawing Figures

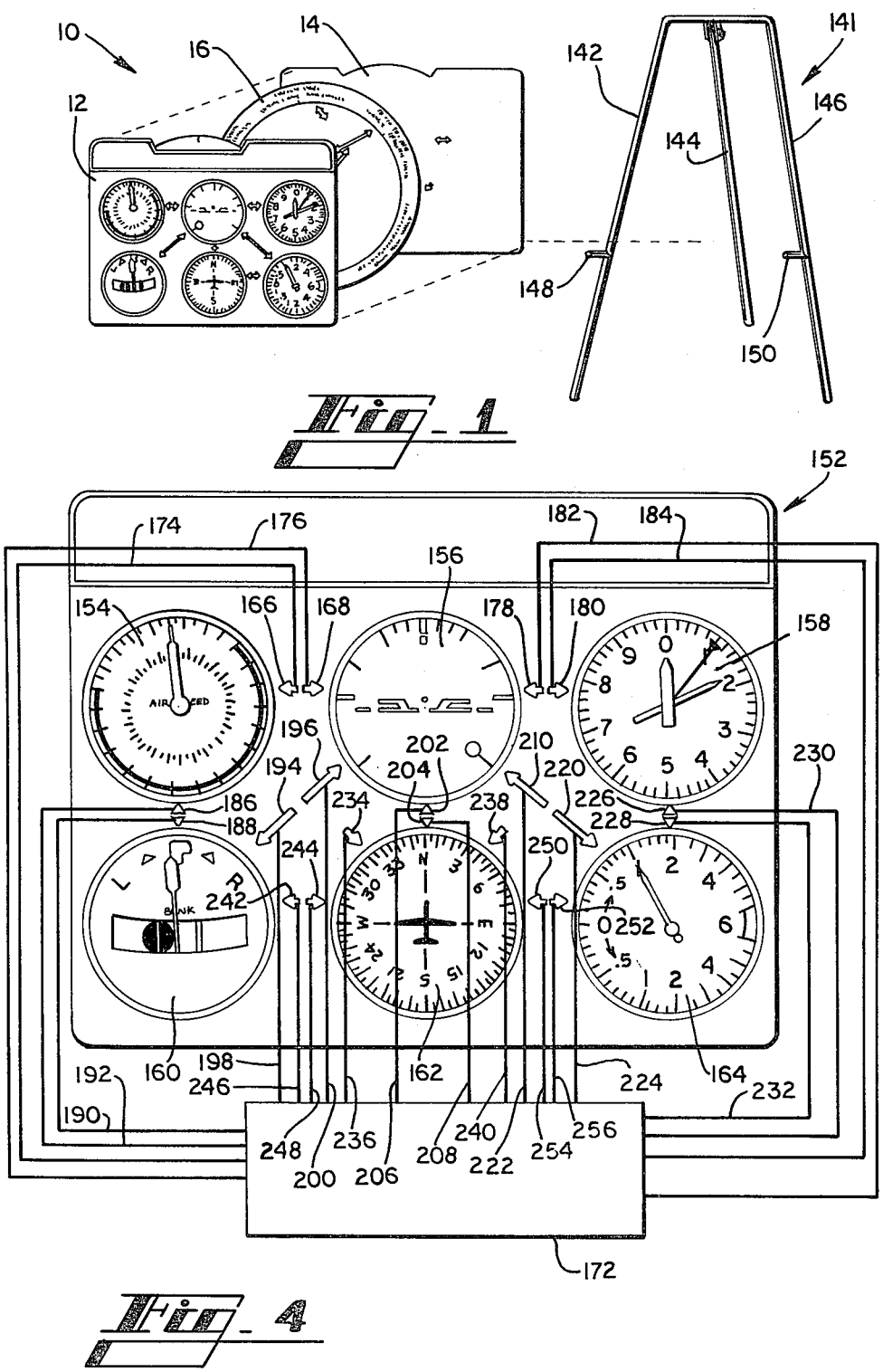

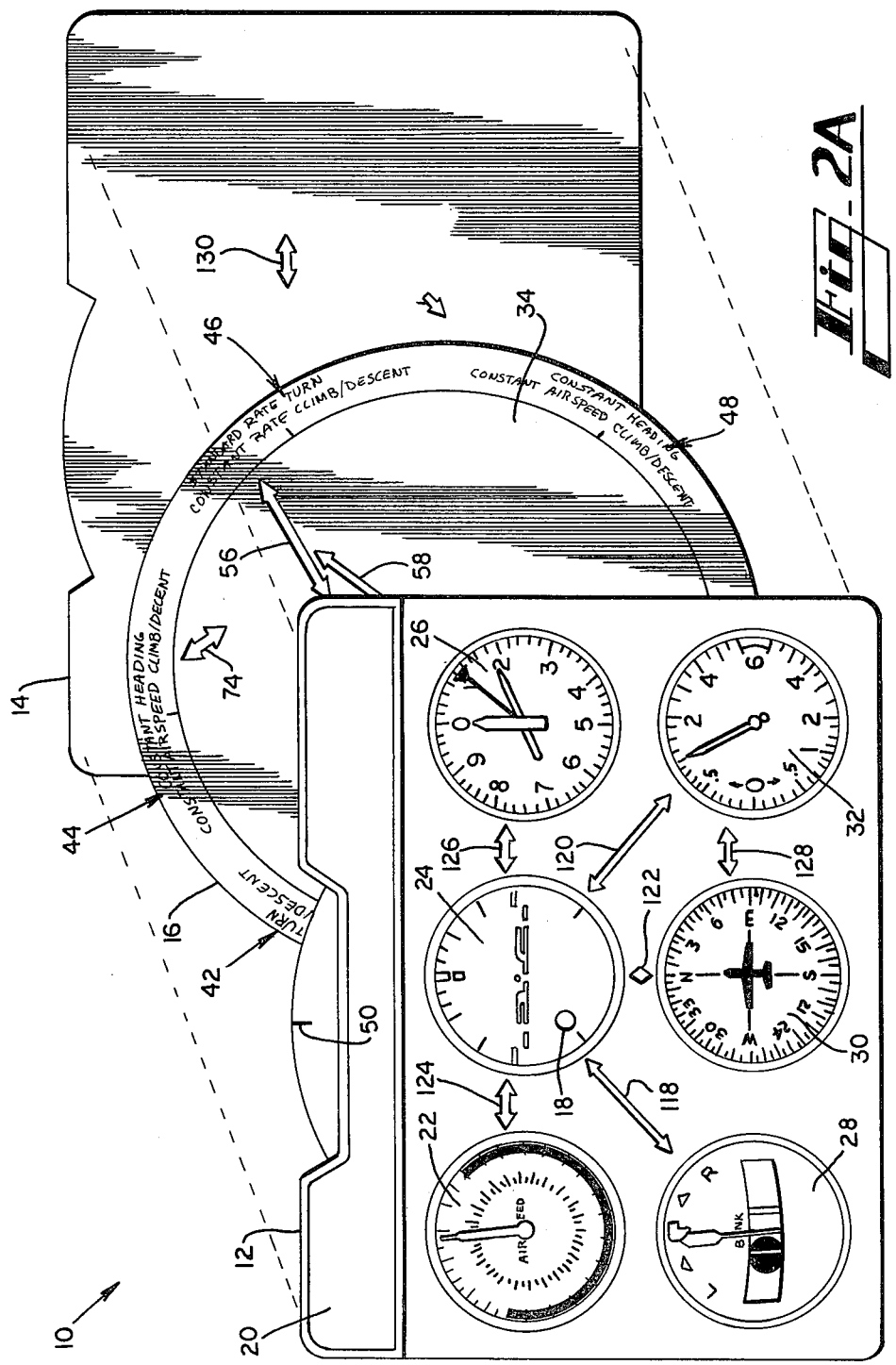
Fig_2A

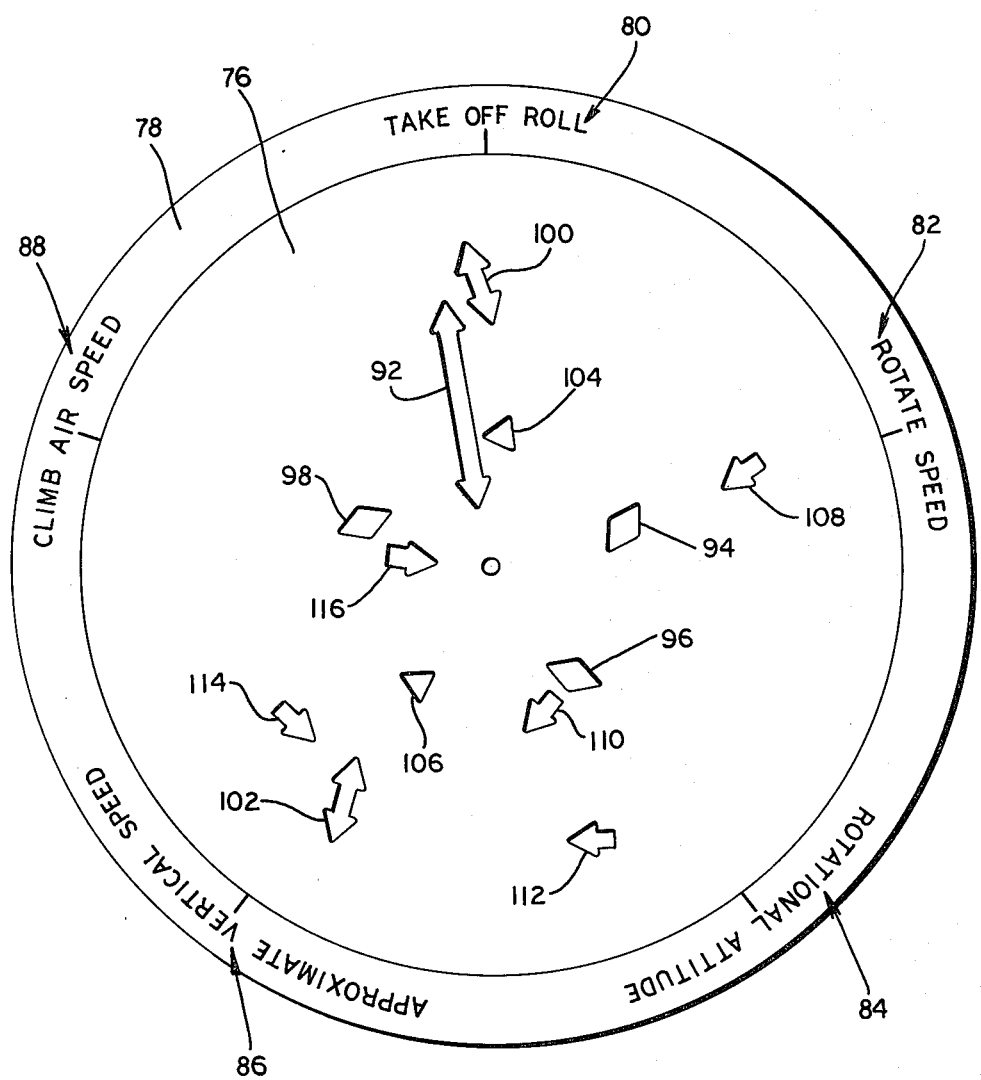
Fig_3A

INSTRUMENT FLIGHT TRAINING AID

TECHNICAL FIELD

This invention relates to instrument flight training aids, and, particularly, to such aids for learning flight instrument scanning patterns.

BACKGROUND OF THE INVENTION

In order for airplanes to be efficiently utilized, they must be capable of flying in a variety of weather conditions. When the weather is good, an airplane can be flown by a pilot with reference only to what the pilot can see out the windows. That is, a pilot can judge turns, climbs, descents and direction by observing visual references, such as the position of the horizon and the sun. However, when the weather degrades so that these external visual references can no longer be accurately relied upon, the pilot must rely on other indicators of the attitude of his airplane.

When external visual references outside the airplane are obscured, the normal senses, such as the sense of balance provided by the inner ear, can be fooled. Without visual references, a pilot relying on his other sense might believe his plane is in a climb when in fact the plane is in a steep bank.

To overcome these problems, flight instruments were developed to provide a pilot with visual indications of the airplane's attitude. Although the type of flight instruments and their arrangement on the instrument panel vary considerably from airplane to airplane, there are certain basic instruments which are typically found in virtually all airplanes. The most frequent arrangement of instruments is referred to as the "Basic T." The central instrument in this arrangement is an artificial horizon or attitude gyro. This instrument usually comprises a card with a black face and a white horizon line on it. The card is attached to a gyro. A minature airplane is attached to the cage so that the artificial horizon moves with respect to the miniature airplane in the same manner as the real airplane moves with respect to the real horizon.

Immediately below the artificial horizon is the heading indicator or directional gyro. This instrument comprises a compass card or an azimuth scale attached to a gyro. The gyro fixes the compass card in space so that the airplane turns around the compass card. The directional gyro performs essentially the same function as a magnetic compass, that is, it provides information about the directional heading of the airplane.

To the right of the artificial horizon is an altimeter. The altimeter interprets changes in air pressure as an airplane climbs or descends, to provide information about the altitude of the airplane.

To the left of the artificial horizon is an air speed indicator. The air speed indicator detects the pressure of the air impacting an external pilot tube as the airplane moves forward through the air. This pressure is converted to give a reading of the relative speed of the airplane with respect to the air through which it is flying.

These four instruments make up the "Basic T." Two other instruments, however, are usually included in addition to these "basic" instruments. To the right of the directional gyro is a vertical speed indicator. This instrument detects the rate of change of air pressure to give indications of how fast an airplane is climbing or descending.

To the left of the directional gyro is a turn and slip indicator. This instrument is actually two instruments in one. The slip indicator is a curved glass tube with a ball inside it. The ball will remain at the bottom of the glass tube when the forces acting on it are balanced; for example, when the plane is in straight and level flight or in a coordinated turn. When the airplane is in a slip or a skid the forces will not be balanced and the ball will be displaced. The turn indicator is another gyro instrument. A needle detects precession of the gyro to give indications of the direction and rate of a turn of the airplane.

Although variations of these instruments will be found in different airplanes, they will usually all be found in the instrument panel in one form or another. With the aid of one or more of these instruments an airplane can be flown without external visual reference.

It is a typical problem when learning to fly an airplane by instruments that the pilot will fixate on only one instrument. This causes him to ignore other instruments which might be giving indications that are important to maintaining the proper flight attitude of the airplane. Accordingly, it is generally recognized that it is essential for a pilot to scan the instruments to thereby prevent fixation and to be fully aware of all the information which is essential to maintain safe flight of the airplane. It is not, however, necessary that the pilot scan all six instruments at all times. For various airplane maneuvers, such as a standard rate turn at constant altitude or straight and level flight, it is critical that only certain instruments be scanned. It is therefore possible to establish scanning patterns for various flight maneuvers.

Although books describe these scanning patterns, heretofore there has not been an effective visual training aid for the learning of flight instrument scanning.

SUMMARY OF THE INVENTION

The present invention relates to an instrument flight training aid for learning flight instrument scanning patterns. The training aid comprises a simulated instrument panel including a plurality of simulated flight instruments spaced from each other on the panel. Visual indicators selectively provide visual indications of selected ones of the simulated flight instruments to be scanned by one observing the panel.

Accordingly, it is an object of the present invention to provide an improved instrument flight training aid.

Another object of the present invention is to provide an instrument flight training aid for learning flight instrument scanning patterns.

A further object of the present invention is to provide an instrument flight training aid which teaches various flight instrument scanning patterns for various flight maneuvers.

Yet another object of the present invention is to provide an instrument flight training aid which is relatively simple to manufacture and use.

Another object of the present invention is to provide an instrument flight training aid which teaches various instrument scanning rates.

These and other objects, features and advantages of the present invention will become apparent after a review of the following detailed description of the disclosed embodiment and the appended drawing and claims.

BRIEF DESCRIPTION OF THE DRAWING

FIG. 1 is an exploded pictorial view of a disclosed embodiment of the instrument flight training aid of the present invention.

FIG. 2A is a detailed exploded pictorial view of of the instrument flight training aid shown in FIG. 1.

FIG. 3A is a detailed rear view of the selector wheel of the instrument flight training aid shown in FIG. 1.

FIG. 4 is a schematic view of another disclosed embodiment of the instrument flight training aid of the present invention.

DETAILED DESCRIPTION OF THE DISCLOSED EMBODIMENT

Figure 2B:
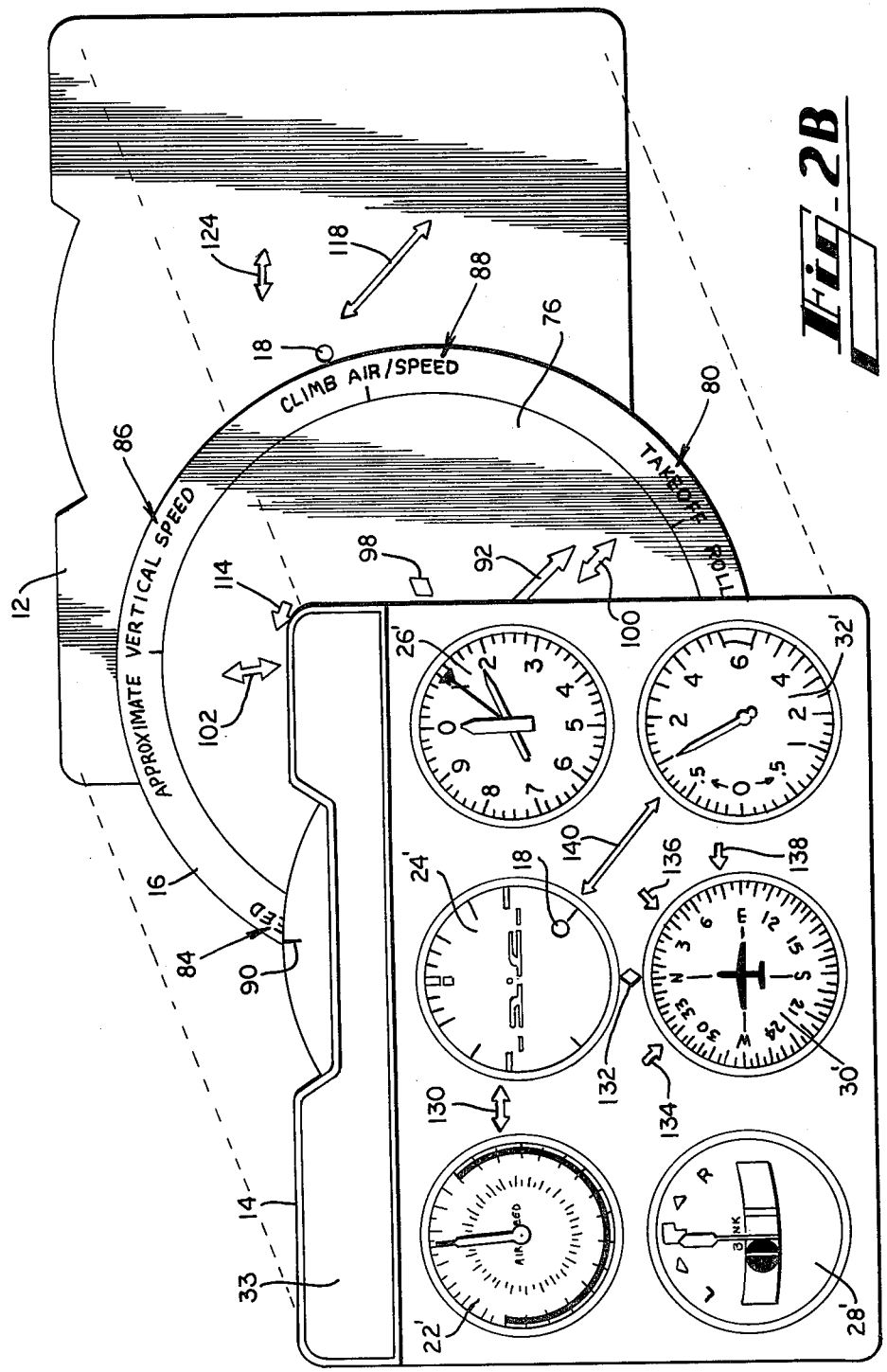
FIG. 2B is a detailed exploded rear view of the instrument flight training aid shown in FIG. 1.
Figure 3B:
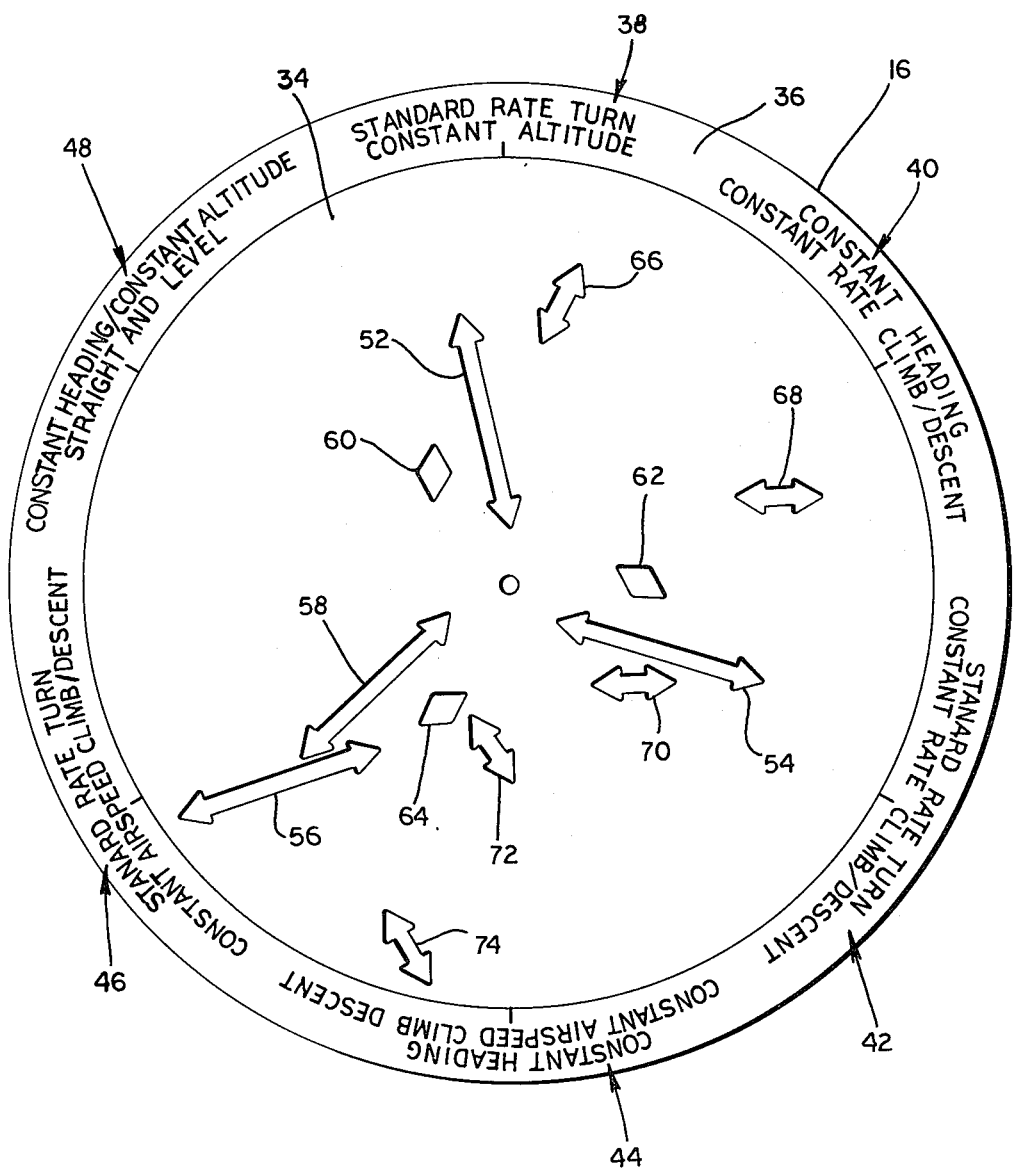
FIG. 3B is a detailed front view of the selector wheel of the instrument flight training aid shown in FIG. 1.

Referring now to the drawing in which like numbers indicate like elements throughout the several views, it will be seen that there is an instrument flight training aid 10 comprising a first simulated instrument panel 12, a second simulated instrument panel 14 and a circular selector wheel 16 rotatably disposed therebetween. A rivet 18 or other suitable fastener extends through the first instrument panel 12, the selector wheel 16 and the second instrument panel 14; the rivet holds those three elements in alignment and permits the selector wheel to be rotated with respect to the two instrument panels.

On the front surface 20 of the first instrument panel 12 are printed indicia to simulate six different flight instruments. The flight instruments represented by the indicia include an air speed indicator 22, an artificial horizon 24, an altimeter 26, a turn and slip indicator 28, a directional gyro 30 and a vertical speed indicator 32. Similarly, printed on the front surface 34 of the second instrument panel 14 are indicia which simulates six identical flight instruments: an air speed indicator 22', an artificial horizon 24', an altimeter 26', a turn and slip indicator 28', a directional gyro 30' and a vertical speed indicator 32'.

Printed on the front surface 34 of the selector wheel 16 around the peripheral edge 36 thereof are indicia which describes various flight manuevers. The indicia describe six different flight manuevers including "Standard Rate Turn Constant Attitude" such as at 38, "Constant Heading Constant Rate Climb/Descent" such as at 40, "Standard Rate Turn Constant Rate Climb/Descent" such as at 42, "Constant Heading Constant Airspeed Climb/Descent" such as at 44, "Standard Rate Turn Constant Airspeed Climb/Descent" such as at 46, and "Constant Heading/Constant Altitude Straight And Level" such as at 48.

It will be appreciated by those skilled in the art that as the selector wheel 16 is rotated about the rivet 18, the indicia 38-48 become serially visible above an index mark 50 printed on the first instrument panel 12.

Also printed on the front surface 34 of the selector wheel 16 radially inwardly of the peripheral edge 36 are indicia comprising a plurality of two-headed arrows having varying lengths. These indicia include four relatively long arrows 52, 54, 56, 58; three relatively short arrows 60, 62, 64; and five intermediate sized arrows 66, 68, 70, 72, 74. The positioning and orientation of the arrows 52-74 will be discussed hereinbelow.

Printed on the back surface 76 of the selector wheel 16 around the peripheral edge 78 thereof are indicia which describe various additional flight manuevers. The indicia describes five different flight manuevers including "Takeoff Roll" such as at 80, "Rotate Speed" such as at 82, "Rotational Attitude" such as at 84, "Approximate Vertical Speed" such as at 86 and "Climb Air/Speed" such as at 88.

It will be appreciated by those skilled in the art that as the selector wheel 16 is rotated about the rivet 18, the indicia 80-88 become serially visible above an index mark 90 printed on the second instrument panel 14.

Also printed on the back surface 76 of the selector wheel 16 radially inwardly of the peripheral edge 78 are indicia comprising a plurality of arrows. These indicia include one relatively long two-headed arrow 92, three relatively short two-headed arrows 94, 96, 98; two intermediate length two-headed arrows 100, 102; two relatively short single headed arrows 104, 106 and five intermediate length single headed arrows 108, 110, 112, 114, 116. The positioning and orientation of the arrows 92-116 will be discussed hereinbelow.

Formed in the first instrument panel 12 are a plurality of two-headed, arrow-shaped openings disposed between adjacent simulated flight instruments 22-28. These arrow-shaped openings include: two relatively long openings 118, 120, one of which extends between the artificial horizon 24 and the turn and slip indicator 28, the other extends between the artificial horizon and the vertical speed indicator 32; one relatively short opening 122 extending between the artificial horizon and the directinal gyro 30 and three intermediate openings 124, 126, 128, one of which extends between the artificial horizon and the airspeed indicator 22, another which extends between the artificial horizon and the altimeter 26 and the other which extends between the directional gyro and the vertical speed indicator.

Similarly, formed in the second instrument panel 14 are a plurality of arrow-shaped openings disposed between adjacent simulated flight instruments 22'-28'. These arrow-shaped openings include: one intermediate length, two-headed openings 130 extending between the artificial horizon 24' and the air speed indicator 22'; one relatively short, two-headed opening 132 extending between the artificial horizon and the directional gyro 30'; three intermediate length, single headed arrows 134, 136, 138, one of which extends from the airspeed indicator toward the directional gyro, another of which extends from the altimeter 26' toward the directional gyro and the other of which extends from the vertical speed indicator 32' toward the directional gyro; and one relatively long two-headed opening 140 which extends between the artificial horizon and the vertical speed indicator.

It will be appreciated by those skilled in the art that when the instrument panels 12, 14 and selector wheel 16 are assembled so that the back surface of the first instrument panel is adjacent the front surface 34 of the selector wheel and the back surface of the second instrument panel is adjacent the back surface 76 of the selector wheel, so that the front surface of the selector wheel is visible through the openings 118-128 to one observing the front surface 20 of the first instrument panel and the back surface of the selector wheel is visible through the openings 130-138 to one observing the front surface 33 of the second instrument panel 14.

The position and orientation of the arrows 52-74 are such that when one of the indicia 38-48 is aligned above the index mark 50, one or more of the arrows is visible through certain of the openings 118-124. For example, when the "Standard Rate Turn Constant Altitude" 38 is aligned with the index mark 50, the arrow 58 is visible through the opening 118 and the arrow 68 is visible through the opening 126. It will also be appreciated that when the selector wheel 16 is aligned in this manner, none of the other arrows are visible through any of the other openings. The visible arrows 58, 68 in the openings 118, 126 are therefore visible indications that the scanning pattern for the "Standard Rate Turn Constant Altitude" flight manuever should be from the artificial horizon 24 to the turn and bank indicator 28 and back; and then from the artificial horizon to the altimeter 26 and back.

When other flight manuevers are aligned with the index mark 50 the arrows visible through the openings are as follows: for "Constant Heading Constant Rate Climb/Descent" 40, the arrow 64 is visible through the opening 122 and the arrow 74 is visible through the opening 128; for "Standard Rate Turn Constant Rate Climb/Descent" 42, the arrows 52, 56 are visible through the openings 118, 120 respectively; for "Constant Heading Constant Airspeed Climb/Descent" 44, the arrows 70, 60 are visible through the openings 124, 122 respectively; for "Standard Rate Turn Constant Airspeed Climb/Descent" 46, the arrows 72, 54 are visible through the openings 124, 118 respectively; and for "Constant Heading/Constant Altitude Straight And Level" 48, the arrows 66, 62 are visible through the openings 126, 122 respectively.

Similarly, when the flight manuevers 80-88 on the back surface 76 of the selector wheel 16 are aligned with the index mark 90 on the second instrument panel 14, the arrows visible through the openings are as follows: for "Takeoff Roll" 80, the arrows 114, 106, 110, 112 are visible through the openings 134, 132, 136, 138 respectively; for "Rotate Speed" 82, the arrows 100, 98 are visible through the openings 130, 132 respectively; for "Rotational Attitude" 84, the arrows 108, 104, 116 are visible through the openings 130, 132, 140 respectively; for "Approximate Vertical Speed" 86, the arrows 94, 92 are visible through the openings 132, 138 respectively; and for "Climb Air Speed" 88, the arrows 102, 96 are visible through the openings 130, 132 respectively.

For easy viewing of either side of the flight training device 10, a conventional tripod-type easel stand 141 can be provided. The stand 141 includes three legs 142, 144, 146 hingably connected at the ends thereof and two posts 148, 150 extending outwardly from two of the legs for supporting the instrument flight training aid thereon.

Operation of the instrument flight training aid 10 will now be considered. The selector wheel 16 is rotated about the rivet 18 until a desired flight manuever, designated by one of the indicia 38-48 is aligned with the index mark 50 on the first instrument panel 12. The instrument flight training aid 10 is then placed on the stand 141 so that the front surface 20 of the first instrument panel 12 can be observed. For example, if "Standard Rate Turn Constant Rate Climb/Descent" 42 is aligned with the index mark 50, only the arrows 52, 56 are visible through the openings 118, 120 respectively. This is an indication to the observer that the scanning pattern for that flight manuever is from the artificial horizon 24 to the turn and slip indicator 28 and back, then from the artificial horizon to the vertical speed indicator 32 and back. The observer should therefore practice moving his eyes from instrument to instrument in the pattern indicated by the arrows which are visible through the openings. If one wishes to practice a scanning pattern which is found on the back surface 76 of the selector wheel 16, the instrument flight training aid 10 can be turned over so that the front surface 33 of the second instrument panel 14 is visible to the observer and the desired flight manuever designed by the indicia 80-88 aligned with the index mark 90 in the same manner as described above.

It is specifically contemplated that the instrument flight training aid of the present invention can include only one instrument panel. The invention has been illustrated using two instrument panels because it permits a greater number of flight manuevers to be listed on the selector wheel. It is also specifically contemplated that other types of visual indicators, such as light emitting diodes, can be substituted for the arrows and openings described above. Such a system using light emitting diodes is described below.

With particular reference to FIG. 4, it will be seen that there is a schematic representation of an instrument panel 152 as can be found in a conventional Link Trainer or other similar flight trainer. The instruments include an air speed indicator 154, an artificial horizon 156, an altimeter 158, a turn and slip indicator 160, a directional gyro 162 and a vertical speed indicator 164. Disposed between adjacent instruments 154-164 are a plurality of arrow-shaped light emitting diodes (LEDs). Between the airspeed indicator 154 and the artificial horizon 154 are two intermediate length LEDs 166, 168 each of which is connected to a microprocessor 172 by an electric circuit 174, 176 respectively. Between the artificial horizon 156 and the altimeter 156 are two intermediate length LEDs 178, 180 each of which is connected to the microprocessor 172 by an electric circuit 182, 184 respectively. Between the airspeed indicator 154 and the turn and slip indicator 160 are two relatively short LEDs 186, 188 each of which is connected to the microprocessor 172 by an electric circuit 190, 192 respectively. Between the artificial horizon 156 and the turn and slip indicator 160 are two relatively long LEDs 194, 196 each of which is connected to the microprocessor 172 by an electric circuit 198, 200 respectively. Between the artificial horizon 156 and the directional gyro 162 are two relatively short LEDs 202, 204 each of which is connected to the microprocessor 172 by an electric circuit 206, 208 respectively. Between the artificial horizon 156 and the vertical speed indicator 164 are two relatively long LEDs 210, 220 each of which is connected to the microprocessor 172 by an electric circuit 222, 224 respectively. Between the altimeter 158 and the vertical speed indicator 164 are two relatively short LEDs 226, 228 each of which is connected to the microprocessor 172 by an electric circuit 230, 232 respectively. Between the LEDs 194, 196 and the directional gyro is a single intermediate length LED 234 which is connected to the microprocessor 172 by an electric circuit 236. Between the LEDs 210, 220 and the direction gyro 162 is a single intermediate length LED 238 which is connected to the microprocessor 172 by an electric circuit 240. Between the turn and slip indicator 160 and the directional gyro 162 are two intermediate length LEDs 242, 244 each of which is connected to the microprocessor 172 by an electric circuit 246, 248 respectively. Between the directional gyro 162 and the vertical speed indicator 164 are two intermediate length LEDs 250, 252 each of which is connected to the microprocessor 172 by an electric circuit 254, 256 respectively.

The microprocessor 172 is designed so that it can cause any one LED or any combination of two or more LEDs to emit light. Furthermore, the microprocessor is designed so that any one of a plurality of scanning patterns can be selected by the user and the appropriate LEDs illuminated. Another feature of the microprocessor design is that the LEDs can be illuminated serially in a desired pattern and at a desired rate. For example, if the flight maneuver "Standard Rate Turn Constant Altitude" is selected from the maneuvers preprogrammed in the microprocessor 172, the LEDs can be illuminated in the following order: first 198, next 196, then 180 and lastly 178. The sequence can then be repeated. The rate at which the LEDs are illuminated can also be varied by the microprocessor 172. For example, in the above-described pattern, the LEDs could be illuminated for one second each to provide a desired scan rate. If a faster scan rate is desired the LEDs could be illuminated for a shorter period of time, for example one-half second each.

It should be understood, of course, that the foregoing relates only to preferred embodiments of the present invention and that numerous modifications or alterations may be made therein without departing from the spirit and scope of the invention as set forth in the appended claims.

We claim:

1. An instrument flight training aid comprising:
    a first simulated instrument panel having a front surface, a back surface and first indicia on said front surface to simulate a plurality of flight instruments spaced from each other on said first panel;
    at least one aperture defined by said first panel between an adjacent pair of said simulated flight instruments;
    first means having second indicia on selected portions of a first surface thereof, said first means being disposed adjacent said back surface of said first panel and selectively orientable with respect to said first panel to a first position such that said second indicia on said first means is visually observable through said aperture in said first panel by one observing said front surface of said first panel and to a second position such that said second indicia on said first means is not visually observable through said aperture in said first panel by one observing said front surface of said first panel, for providing a visual indication of selected ones of said flight instruments to be scanned by one observing said front surface of said first panel.

2. The instrument flight training aid of claim 1, further comprising third indicia on said first means and second means for selectively displaying said third indicia in response to movement of said first means, such that said third indicia is visually observable when said first means is in said first position and said third indicia is not visually observable when said first means is in said second position.

3. The instrument flight training aid of claim 2 further comprising:
    a second simulated instrument panel having a front surface, a back surface and fourth indicia on said front surface to simulate a plurality of flight instruments spaced from each other on said second panel;
    at least one aperture defined by said second panel between an adjacent pair of said simulated flight instruments;
    fourth indicia on selected portions of a second surface of said first means, said back surface of said second panel being disposed adjacent said second surface of said first means;
    said first means being selectably orientable with respect to said second panel to a third position such that said fourth indicia on said first means is visually observable through said aperture in said second panel by one observing said front surface of said second panel and to a fourth position such that said fourth indicia is not visually observable through said aperture in said second panel by one observing said front surface of said second panel.

4. The instrument flight training aid of claim 3 further comprising fifth indicia on said first means and third means for selectively displaying said fifth indicia in response to movement of said first means such that said fifth indicia is visually observable when said first means is in said third position and said fifth indicia is not visually observable when said first means is in said fourth position.

5. An instrument flight training aid for practicing instrument scanning patterns, comprising: a simulated instrument panel including a plurality of simulated flight instruments spaced from each other on said panel; and
    a plurality of separate visual indication means individually juxtaposed adjacent and in indicating relation to said simulated flight instruments and operative in a plurality of certain combinations for selectively providing visual indications of selected ones of said simulated flight instruments to be scanned by one observing said panel.

6. The instrument flight training aid of claim 5 wherein said visual indication means comprises a plurality of means for emitting light adjacent selected ones of said simulated flight instruments.

7. The instrument flight training aid of claim 6 further comprising means for selectively controlling the emission of light from selected ones of said light emitting means.

8. The instrument flight training aid of claim 7 wherein said controlling means variably controls the rate at which different ones of said plurality of light emitting means emit light.

9. The instrument flight training aid of claim 5 wherein said indication means are located between adjacent pairs of said simulated flight instruments, and are selectably operative to provide said visual indications of selected simulated flight instruments.

10. In an instrument flight panel including a plurality of flight instruments spaced from each other on said panel which instruments are visually scannable by one observing said panel, the improvement comprising:
    means located between adjacent pairs of said flight instruments for selectively providing visual indications of selected ones of said flight instruments to be scanned by said person observing said panel.

* * * * *